United States Patent [19]
Cononie

[11] Patent Number: 5,849,243
[45] Date of Patent: Dec. 15, 1998

[54] FLEXIBLE ACETYLENE CUTTING TORCH HANDLE

[76] Inventor: Charles C. Cononie, 180 WPA Box 482, Salix, Pa. 15952

[21] Appl. No.: 842,908

[22] Filed: Apr. 17, 1997

[51] Int. Cl.$^6$ ........................................................ B23K 7/00
[52] U.S. Cl. ................................................. 266/77; 266/48
[58] Field of Search .................................. 266/48, 76, 77, 266/66; 239/588

[56] References Cited

U.S. PATENT DOCUMENTS

| | | | |
|---|---|---|---|
| D. 320,726 | 10/1991 | Gartin | D8/41 |
| 1,516,655 | 11/1924 | Wade | 239/588 |
| 2,203,210 | 6/1940 | Young | 266/77 |

FOREIGN PATENT DOCUMENTS

| | | | |
|---|---|---|---|
| 15847 | of 1910 | United Kingdom | 266/48 |
| 346270 | 4/1931 | United Kingdom | 239/588 |

*Primary Examiner*—Scott Kastler

[57] ABSTRACT

A new Flexible Acetylene Cutting Torch Handle for offering an acetylene torch that is easier to use in tight and obstructed places. The inventive device includes a flexible hose, an anti-bend casing, and a clip. In use, the inventive device is useful when the work area is obstructed or other items or surfaces are close to the area where the torch must be applied. The flexible torch has a special flexible stainless steel neck which can be bent as needed to make it easier to apply the flame from the head of the torch exactly where it is needed in situations where close quarters or obstructions create problems. The inventive device has a special cover which holds the neck straight and rigid when the user needs a conventional configuration. The cover is easy to install and remove using simple wing screws. Under normal conditions, a user will leave this cover in place, enabling conventional use of the product. When a special situation arises, the cover is quickly and easily removed.

11 Claims, 3 Drawing Sheets

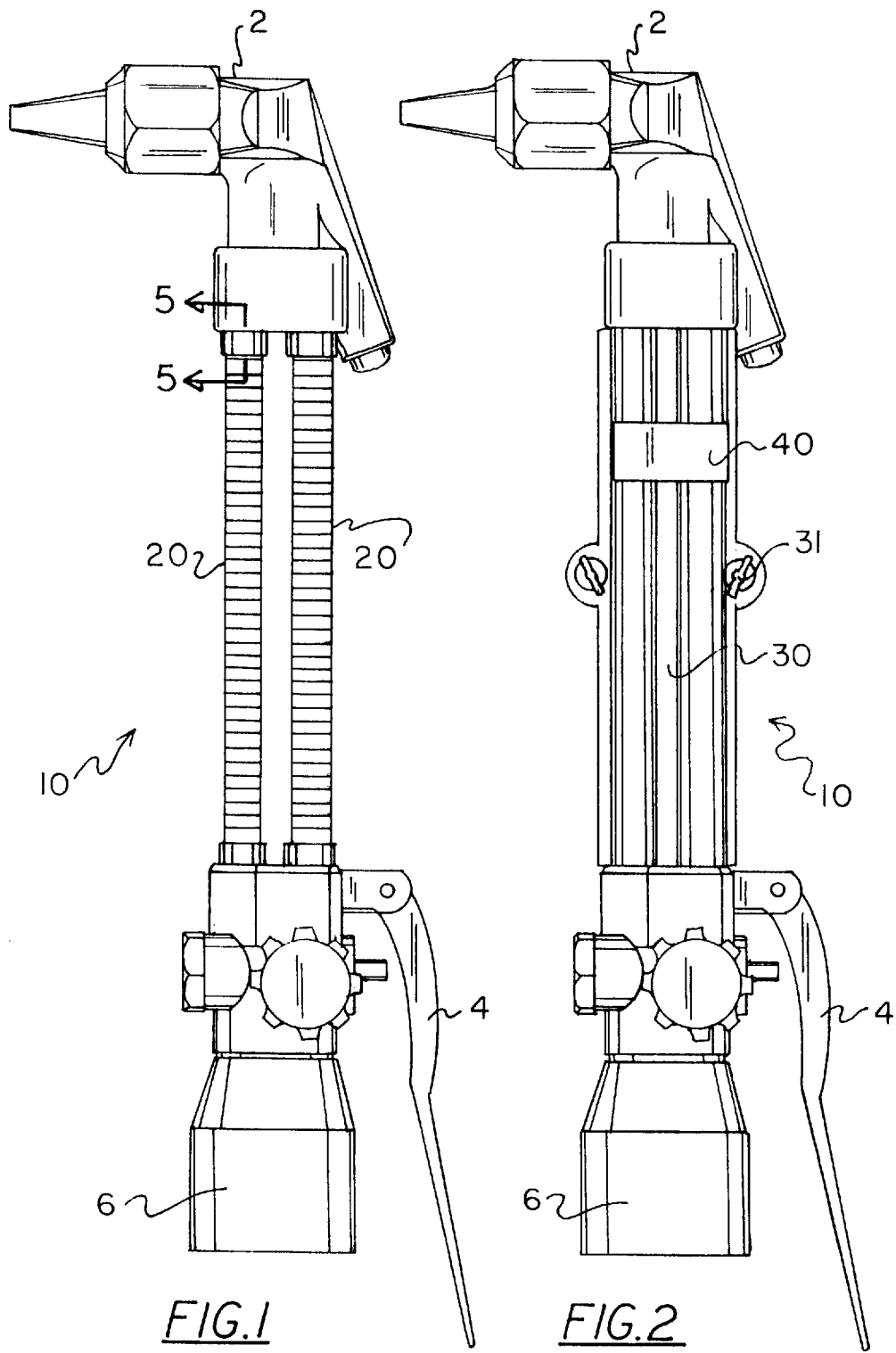

FLEXIBLE ACETYLENE CUTTING TORCH HANDLE

BACKGROUND OF THE INVENTION

1. Field of the Invention

The present invention relates to acetylene torch tools and more particularly pertains to a new Flexible Acetylene Cutting Torch Handle for offering an acetylene torch that is easier to use in tight and obstructed places.

2. Description of the Prior Art

The use of acetylene torch tools is known in the prior art. More specifically, acetylene torch tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art acetylene torch tools include U.S. Pat. No. 4,268,740; U.S. Pat. No. 4,443,683; U.S. Pat. No. Des. 320,726; U.S. Pat. No. 4,884,177; U.S. Pat. No. 5,403,987; and U.S. Pat. No. 4,923,394.

While these devices fulfill their respective, particular objectives and requirements, the aforementioned patents do not disclose a new Flexible Acetylene Cutting Torch Handle. The inventive device includes a flexible hose, an anti-bend casing, and a clip and is a conventional acetylene torch of the type that is used to cut metal, weld, braise, and so forth. The product is made primarily from brass and copper, with a handle assembly, neck, and a head. The handle has standard gas hookups and a simple squeeze trigger valve assembly. Gas for the torch leads through the neck to the offset head. The head terminates in a nozzle where the flame is produced. Unlike a conventional torch, which has a rigid copper neck, the inventive device has a neck made from numerous stainless steel rings, therefore making up a flexible goose neck design. This neck enables the head to be moved to various orientations when the user has trouble applying the flame to a particular spot in his work. To prevent the neck from flexing when the user wants it to remain straight, the inventive device has a special neck cover. This cover is a half round piece of rigid metal which snaps onto the neck. Two simple wing screws enable it to be tightened into place. When the user wants to take advantage of the flexible neck, he simply loosens the wing screws and snaps off the cover. The wing screws and nuts will loosen, but will not fall out. To hold the cover when not in use, the cover has a clip-on to clip it onto a hose.

In these respects, the Flexible Acetylene Cutting Torch Handle according to the present invention substantially departs from the conventional concepts and designs of the prior art, and in so doing provides an apparatus primarily developed for the purpose of offering an acetylene torch that is easier to use in tight and obstructed places.

SUMMARY OF THE INVENTION

In view of the foregoing disadvantages inherent in the known types of acetylene torch tools now present in the prior art, the present invention provides a new Flexible Acetylene Cutting Torch Handle construction wherein the same can be utilized for offering an acetylene torch that is easier to use in tight and obstructed places.

The general purpose of the present invention, which will be described subsequently in greater detail, is to provide a new Flexible Acetylene Cutting Torch Handle apparatus and method which has many of the advantages of the acetylene torch tools mentioned heretofore and many novel features that result in a new Flexible Acetylene Cutting Torch Handle which is not anticipated, rendered obvious, suggested, or even implied by any of the prior art acetylene torch tools, either alone or in any combination thereof.

To attain this, the present invention generally comprises a flexible hose, an anti-bend casing, and a clip. Modern acetylene torches are quite reliable and useful in a whole host of potential applications. They can be used in cutting metals, in welding and braising, and in general purpose heating applications. Unfortunately, there are certain situations in which it may be difficult to use such a torch. For example, when the work area is obstructed or other items or surfaces are close to the area where the torch must be applied, safely applying the torch can be a problem. If the torch has to be held and used in an awkward manner to get the job done, it might be dangerous to the user. In addition, there is often a chance that problems in applying the torch will lead to the materials being burnt or other nearby materials being damaged or ruined. The flexible torch has been designed as a solution to the above described problems. It would be made much like a conventional acetylene torch, but would have a special flexible stainless steel neck instead of a rigid copper one. This neck can be bent as needed to make it easier to apply the flame from the head of the torch exactly where it is needed in situations where close quarters or obstructions create problems. In these situations, the simple modification of the flexible neck of the flexible torch makes the device more convenient and safe than an existing torch. The flexible neck saves the time and effort that the users might have otherwise spent in frustrating attempts to use a regular torch in a situation where it was simply inadequate. In addition, the flexible torch might help to prevent accidents that can occur if a regular torch is used in some awkward and unsafe manner. Personal injuries to the torch user might be averted, and damages to materials might also be prevented. The flexible neck of the flexible torch would not be a hindrance or a hazard in situations where the user wanted a straight neck. The product comes with a special cover which holds the neck straight and rigid when the user needs the device that way. The cover would be easy to install and remove using simple wing screws. Under normal conditions, a person would probably leave this cover in place, enabling him to use the product exactly like a conventional torch. When a special situation arose, however, and the flexible nature of the neck could be useful, the cover could be quickly and easily removed. In regard to the flexible torch, it may be interesting to note the recent performance of the welding equipment industry, which produces cutting torches and related equipment.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Flexible Acetylene Cutting Torch Handle apparatus and method which has many of the advantages of the acetylene torch tools mentioned heretofore and many novel features that result in a new Flexible Acetylene Cutting Torch Handle which is not anticipated, rendered obvious, suggested, or even implied by any of the prior art acetylene torch tools, either alone or in any combination thereof.

It is another object of the present invention to provide a new Flexible Acetylene Cutting Torch Handle which may be easily and efficiently manufactured and marketed.

It is a further object of the present invention to provide a new Flexible Acetylene Cutting Torch Handle which is of a durable and reliable construction.

An even further object of the present invention is to provide a new Flexible Acetylene Cutting Torch Handle which is susceptible of a low cost of manufacture with regard to both materials and labor, and which accordingly is then susceptible of low prices of sale to the consuming public, thereby making such Flexible Acetylene Cutting Torch Handle economically available to the buying public.

Still yet another object of the present invention is to provide a new Flexible Acetylene Cutting Torch Handle which provides in the apparatuses and methods of the prior art some of the advantages thereof, while simultaneously overcoming some of the disadvantages normally associated therewith.

Still another object of the present invention is to provide a new Flexible Acetylene Cutting Torch Handle for offering an acetylene torch that is easier to use in tight and obstructed places.

Yet another object of the present invention is to provide a new Flexible Acetylene Cutting Torch Handle which includes a flexible hose, an anti-bend casing, and a clip.

Still yet another object of the present invention is to provide a new Flexible Acetylene Cutting Torch Handle that is a device that has all of the current features of an acetylene torch tool.

Even still another object of the present invention is to provide a new Flexible Acetylene Cutting Torch Handle that is convertible from a conventional acetylene torch to a flexible acetylene torch.

Still yet another object of the present invention is to provide a new Flexible Acetylene Cutting Torch Handle that allows the user to use the tool in otherwise difficult situations and applications therefore preventing personally dangerous situations or preventing materials from damage or ruin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevation view illustrating a flexible hose portion of a new Flexible Acetylene Cutting Torch Handle according to the present invention.

FIG. 2 is a side elevation view illustrating an anti-bend casing of the present invention.

DESCRIPTION OF THE PREFERRED EMBODIMENT

Figure 3:
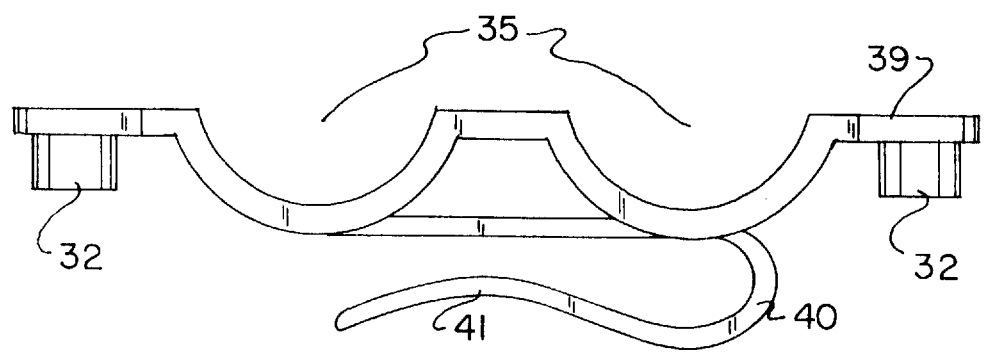
FIG. 3 is an enlarged, detailed end view of a cover of the present invention.
Figure 4:
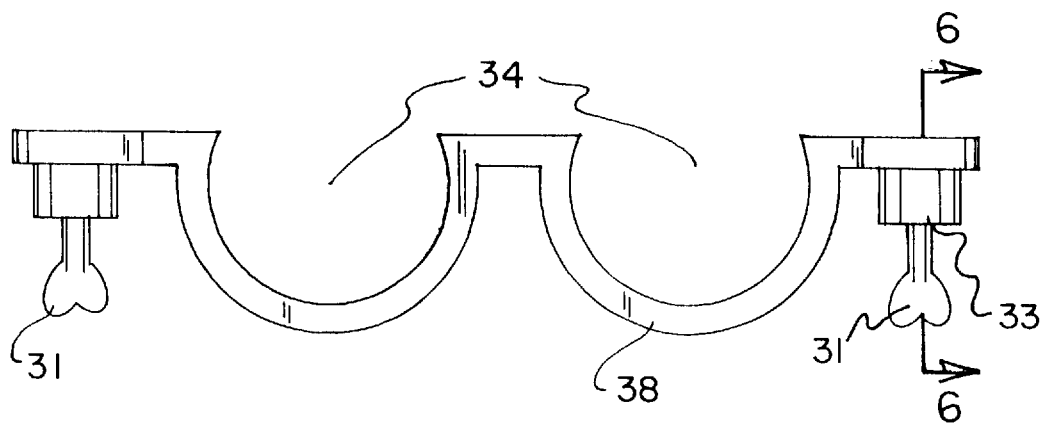
FIG. 4 is an enlarged detailed end view of an anti-bend casing of the invention.
Figure 5:
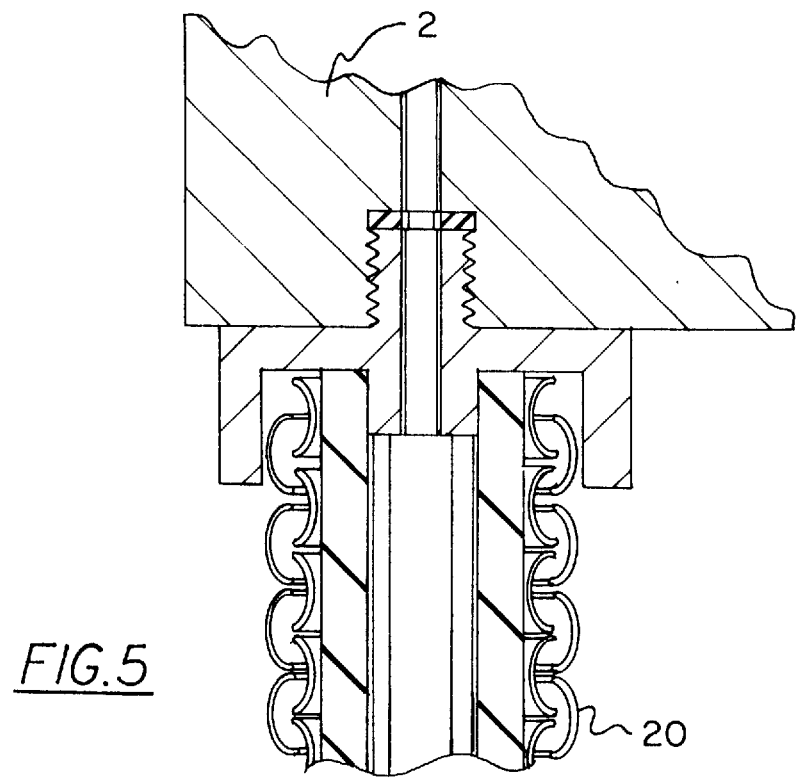
FIG. 5 is a cross sectional view taken along line 5—5 of FIG. 1.
Figure 6:
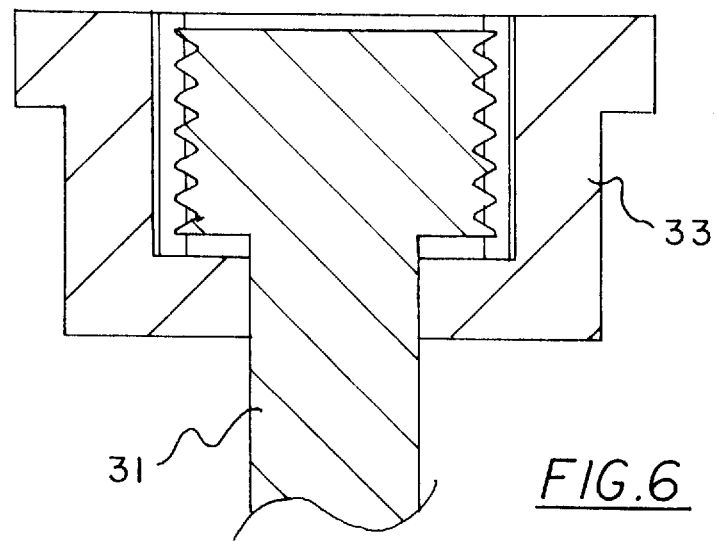
FIG. 6 is a cross sectional view taken along line 6—6 of FIG. 4.

With reference now to the drawings, and in particular to FIGS. 1 through 6 thereof, a new Flexible Acetylene Cutting Torch Handle embodying the principles and concepts of the present invention and generally designated by the reference numeral 10 will be described.

More specifically, it will be noted that the Flexible Acetylene Cutting Torch Handle 10 comprises a flexible hose 20, an anti-bend casing 30, and a clip 40, wherein the flexible hose 20 attachedly connects a nozzle 2 to a handle 4 of an acetylene torch 6 and the anti-bend casing 30 clamps around the flexible hose 20 therefore making the length of flexible hose 20 rigid and thereby straight and prevents it from flex and where clip 40 is fixedly attached to an outer periphery of the anti-bend casing 30.

As best illustrated in FIGS. 1 through 6, it can be shown that the inventive device, and in particular, the flexible hose 20, the anti-bend casing 30, and the clip 40 are added to a conventional acetylene torch of the type that is used to cut metal, weld, braze, and so forth.

The flexible hose 20 is further defined as a flexible goose neck design made from numerous stainless steel rings. This neck enables the head to be moved to various orientations when the user has trouble applying the flame to a particular spot in his work.

The anti-bend casing 30 which clamps around the flexible hose 20 and therefore makes the length of flexible hose 20 rigid and thereby prevents the neck from flexing is comprised of a non-removable wing screw 31, a nut 32, a swivel retainer 33, hose apertures 34, cover apertures 35, a hose receptacle 38, and a cover 39 wherein the hose receptacle 38 and the cover 39 are half round pieces of rigid material such as metal which snaps onto the flexible hose 20 and where at least one simple wing screw 31 enables the hose receptacle 38 to be removably attached and tightened into place onto the cover 39.

When the user wants to take advantage of the flexible hose 20, he simply loosens the wing screw 31 and snaps off the cover 39. The wing screw 31 and nut 32 will loosen, but will not fall out. To hold the cover 39 and therefore the anti-bend casing 30 as well, when not in use, the cover 39 has a clip 40 fixedly attached to the cover 39 and where the clip 40 is further comprised of a clip arm 41 which is an elongated, spring biased, protrusion and applies spring biased force to removably and temporarily fasten the cover 39 and therefore the anti-bend casing 30 as well, onto a hose.

In use, modern acetylene torches are quite reliable and useful in a whole host of potential applications. They can be used in cutting metals, in welding, and braising, and in general purpose heating applications. The inventive device is useful when the work area is obstructed or other items or surfaces are close to the area where the torch must be applied. The flexible torch has a special flexible stainless steel neck which can be bent as needed to make it easier to apply the flame from the head of the torch exactly where it is needed in situations where close quarters or obstructions create problems. The inventive device has a special cover which holds the neck straight and rigid when the user needs a conventional configuration. The cover is easy to install and remove using simple wing screws. Under normal conditions, a user will leave this cover in place, enabling conventional use of the product. When a special situation arises, the cover is quickly and easily removed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A flexible acetylene cutting torch handle comprising:
   a flexible hose;
   an anti-bend casing, and
   a clip, wherein the flexible hose attachedly connects a nozzle to a handle of an acetylene torch and the anti-bend casing clamps around the flexible hose therefore making a length of flexible hose rigid and where the clip is fixedly attached to an outer periphery of the anti-bend casing;
   wherein the flexible hose, the anti-bend casing, and the clip are added to an acetylene torch;
   wherein the flexible hose is further defined as a flexible goose neck design made from numerous stainless steel rings and where the flexible goose neck design enables the head to be moved to various orientations; and
   wherein the anti-bend casing is comprised of a non-removable wing screw, a nut, a swivel retainer, hose apertures, cover apertures, a hose receptacle, and a cover wherein the hose receptacle and the cover are half round pieces of rigid material which snaps onto the flexible hose and where at least one wing screw enables the hose receptacle to be removably attached and tightened into place onto the cover.

2. The flexible acetylene cutting torch handle of claim 1, wherein the wing screw is adapted to be retained on said cover when said wing screw and nut are loosened.

3. The flexible acetylene cutting torch handle of claim 1, wherein the cover of the anti-bend casing is removably and temporarily fastened onto the hose by the clip.

4. The flexible acetylene cutting torch handle of claim 3, wherein the clip is fixedly attached to the cover and where the clip is further comprised of a clip arm which is an elongated, spring biased, protrusion and applies spring biased force to removably and temporarily fasten the cover and the anti-bend casing onto the hose.

5. A flexible acetylene cutting torch handle comprising:
   a flexible hose;
   an anti-bend casing; and
   a clip, wherein the flexible hose attachedly connects a nozzle to a handle of an acetylene torch and the anti-bend casing clamps around the flexible hose therefore making a length of flexible hose rigid and where the clip is fixedly attached to an outer periphery of the anti-bend casing; and
   the anti-bend casing comprises:
      a non-removable wing screw;
      a nut;
      a swivel retainer;
      hose apertures;
      cover apertures;
      a hose receptacle; and
      a cover wherein the hose receptacle and the cover are half round pieces of rigid material which snaps onto the flexible hose and where at least one wing screw enables the hose receptacle to be removably attached and tightened into place onto the cover.

6. The flexible acetylene cutting torch handle of claim 5, wherein the flexible hose, the anti-bend casing, and the clip are added to an acetylene torch.

7. The flexible acetylene cutting torch handle of claim 6, wherein the flexible hose is further defined as a flexible goose neck design made from numerous stainless steel rings and where the flexible goose neck design enables the head to be moved to various orientations.

8. A flexible acetylene cutting torch handle comprising:
   a flexible hose;
   an anti-bend casing;
   a clip, wherein the flexible hose attachedly connects a nozzle to a handle of an acetylene torch and the anti-bend casing clamps around the flexible hose therefore making a length of flexible hose rigid and where the clip is fixedly attached to an outer periphery of the anti-bend casing;
   the flexible hose, the anti-bend casing, and the clip are added to an acetylene torch;
   the flexible hose is a flexible goose neck design made from numerous stainless steel rings and where the flexible goose neck design enables the head to be moved to various orientations;

the anti-bend casing is comprises:
  a non-removable wing screw;
  a nut;
  a swivel retainer;
  hose apertures;
  cover apertures;
  a hose receptacle; and
  a cover wherein the hose receptacle and the cover are half round pieces of rigid material which snaps onto the flexible hose and where at least one wing screw enables the hose receptacle to be removably attached and tightened into place onto the cover.

9. The flexible acetylene cutting torch handle of claim 8, wherein the wing screw and nut will not fall out.

10. The flexible acetylene cutting torch handle of claim 8, wherein the cover of the anti-bend casing is removably and temporarily fastened onto the hose by the clip.

11. The flexible acetylene cutting torch handle of claim 10, wherein the clip is fixedly attached to the cover and where the clip is further comprised of a clip arm which is an elongated, spring biased, protrusion and applies spring biased force to removably and temporarily fasten the cover and the anti-bend casing onto the hose.

* * * * *